July 2, 1957 R. P. PROBERT ET AL 2,797,549
COMBUSTION APPARATUS INCORPORATING A COMBUSTION
CHAMBER OF THE CYCLONE OR VORTEX TYPE
Filed Nov. 5, 1951 5 Sheets-Sheet 1

United States Patent Office 2,797,549
Patented July 2, 1957

2,797,549

COMBUSTION APPARATUS INCORPORATING A COMBUSTION CHAMBER OF THE CYCLONE OR VORTEX TYPE

Rhys Price Probert, Frimley Green, Aldershot, and Alexander Pearse Johnstone, Frimley, England, assignors to Power Jets (Research and Development) Limited, London, England, a British company Application November 5, 1951, Serial No. 254,928

Claims priority, application Great Britain November 17, 1950

7 Claims. (Cl. 60—39.23)

This invention relates to combustion apparatus incorporating a so-called cyclone or vortex type combustion chamber—i. e. one wherein fuel particles are burnt in air which enters the chamber tangentially, or nearly so, and moves from the periphery inwards with a vortex motion towards the axis of the chamber and so into an axially-extending central outlet for the combustion products. Such a combustion chamber may be used for example in a gas turbine power plant. There is at least one, and usually a plurality of substantially tangential air inlets around the periphery of this chamber. According to the invention the outside of the combustion chamber is cooled by a flow of air from the source which supplied the combustion air, and a separate valve is provided in the air supply connection to each said air inlet whereby the combustion air stream or streams branched from the cooling stream can be varied independently of the cooling stream, and possibly independently of one another. The quantity of cooling air passing through will usually be considerable, compared with the quantity of combustion air. There may be an individual burner for each of several air inlets to the combustion chamber and separate valves controlling the supply of fuel to each such burner to enable the air and fuel supply to one point of the chamber to be controlled and in particular to be cut off independently of the supplies to other points.

The cooling air, or some of it, may form at least part of the combustion air. Preferably, some or all of the cooling air, after passing over the combustion chamber walls, joins and mixes with the combustion products in the outlet from the combustion chamber. In particular, the cooling air is discharged into this outlet in two streams—an inner stream, which mixes readily with the combustion gases, and an annular stream which washes over and tends to cool the inner surface of the wall of the discharge outlet. These airstreams should be given a swirl in the same direction as the combustion products; the kinetic energy of swirl of the whole exhaust stream can then be recovered to some extent in a suitably designed exhaust volute or in the first stage of the turbine if the combustion chamber be mounted co-axially therewith.

One particular construction according to the invention and a modification are shown in Figures 1–3 of the accompanying drawings, of which:

Figure 1:
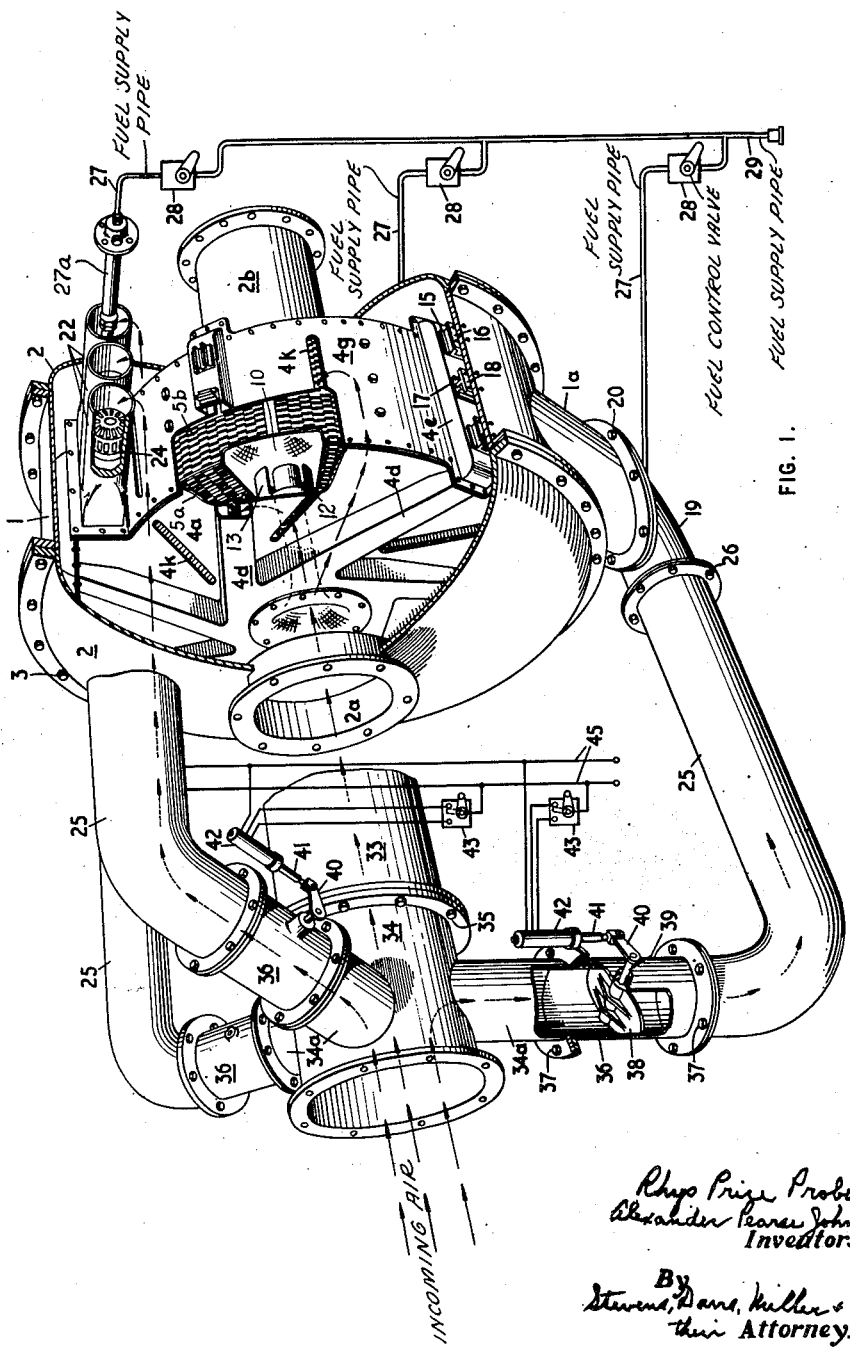
Figure 1 is an isometric view of the one construction showing the air inlet end of the combustion chamber.
Figure 2:
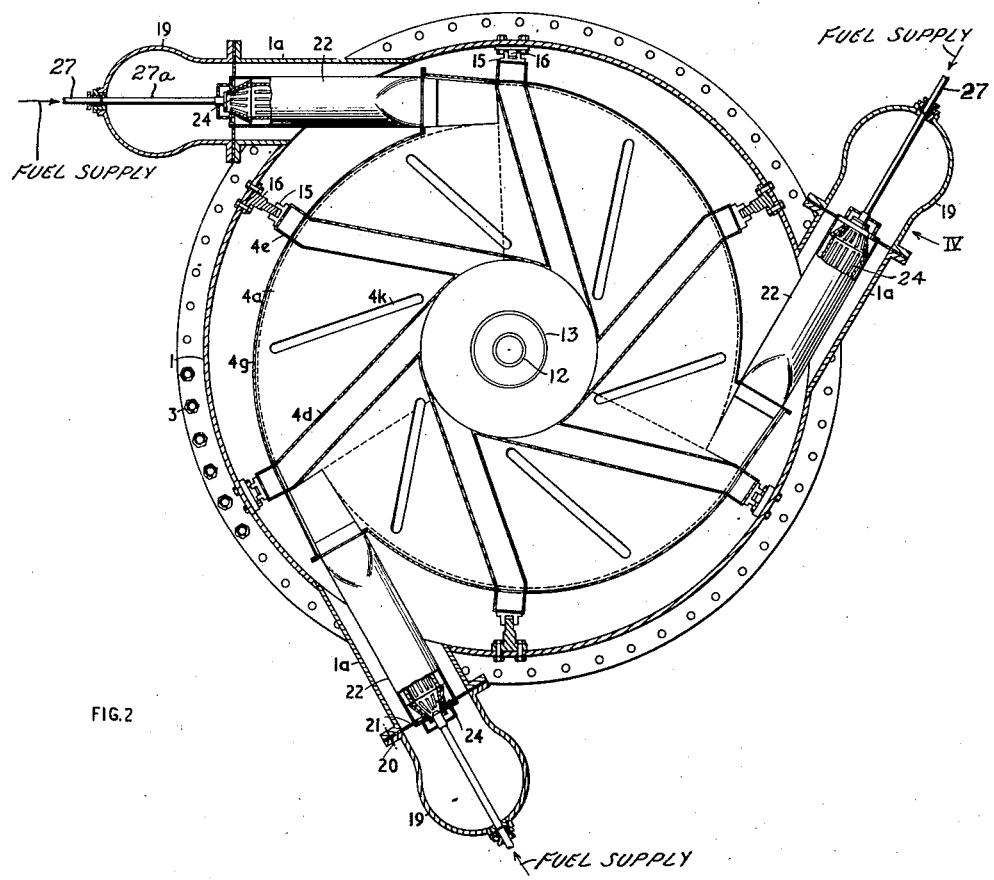
Figure 2 is a diametral cross-section of the arrangement according to Figure 1 looking from the outlet end of the combustion chamber.

In Figures 1 and 2, the outer pressure casing is made up of a flanged cylindrical body 1 (apertured as hereinafter described) and peripherally-flanged centrally-apertured domed end covers 2 bolted on to the ends of the body 1 by bolts 3 through the abutting flanges. The combustion chamber inside the pressure casing has three substantially tangential entries equally spaced around its periphery as seen in Figure 2. This combustion chamber is hollow walled and consists of an inner skin and an outer skin. The outer skin has two centrally apertured outer side plates 4a and an outer peripheral plate 4g and the inner skin has corresponding side and peripheral wall elements 5a and 5b respectively. The inner wall 5a on one side of the chamber has a central conduit 13 extending axially from the central aperture in that wall. Each outer side plate 4a has six radiating hollow ribs 4d and the peripheral plate 4g is stiffened by longitudinal hollow ribs 4e joining the ends of ribs 4d.

While the inner skin of the chamber, apart from the three tangential inlets, is substantially fluid tight, the plates 4a and 4g of the outer skin have slits 4k located between the tubular ribs constituting inlets for admitting cooling air to the interior of the hollow walls. The interior of the hollow walls communicates with the interior of the hollow ribs 4e. The latter communicate with annular collecting boxes from which the cooling air is led towards the outlet for combustion products leaving the chamber. Thus from one box air is directed through an annular passage formed between a central conduit 12 of the outer skin and the central conduit 13 of the inner skin of the combustion chamber to join the combustion products leaving the central aperture 10 of opposite inner side wall of the chamber.

The latter chamber is mounted in the outer casing, with free space all round for cooling air, by the pairs of complementary mating members 15—16 and 17—18 permitting thermal expansion while restraining the combustion chamber against bodily movement radially and circumferentially.

This construction of combustion chamber and method of mounting is not described in detail as it is set forth in full in the co-pending United States patent application Serial No. 254,882 (Cowlin et al.).

The flanged inlet pipe 2a enters the central aperture in one of the ends covers 2 (Figure 1) and is welded or otherwise secured to the cover 2. A flanged outlet pipe 2b is similarly mounted on the other one of the end covers 2. Some of the air entering the inlet pipe 2a flows immediately through the central conduit 12 to join the outgoing combustion products.

The peripheral form of the combustion chamber can be seen in Figure 2 to consist of three volute curves joined by radial or substantially radial steps. Opposite to each of these stepped portions where the entries for the combustion air and fuel are formed is an aperture in the cylindrical part 1 of the outer casing from which projects substantially tangentially to the casing a flanged tubular part 1a. Bolted on to this part 1a by bolts 20 through the flanges, is the flanged inlet head 19 which constitutes a right-angled pipe bend to which is connected the flanged air supply pipe 25 by bolts 26 through the flanges.

Extending across the head 19 and held by the bolts 20 between the flanges of head 19 and the tubular part 1a of the outer casing, is the inlet cover 21. The part 1a and the adjacent end of the head 19 are shown as of oval shape to accommodate a row of three burners. Each burner is enclosed by a separate tube 22 of which the cylindrical upper end is secured to the cover plate 21 and fits tightly in one of three apertures therein. Thus the cooling air from the outer casing cannot get into the tube 22, and cover plate 21 moreover shuts off connection between the cooling air in the outer casing and tubular part 1a and air in the inlet head 19. The lower ends of tubes 22 are of rectangular cross-section; they slide in and fill the tangential entry of the combustion chamber as set forth in the said application Serial No. 254,882; no appreciable quantity of cooling air from the outer casing can leak into the combustion air entry to the combustion chamber. By reason of the substantially fluid tight inner skin of the combustion chamber and the closing plate 21 the entire air supply, apart from combustion air admitted to the chamber by way of the tubes 22, is constrained to by-pass the combustion process and to join the combustion products leaving the chamber. The apparatus is so proportioned that said by-passed part is a major part of the total incoming air.

The burners 24 need not be illustrated and described in detail because their construction is no part of the present invention and each can be of some conventional form consisting, for example, of a flame tube inside the tubular burner casing, a baffle for maintaining a stable zone of combustion and a liquid fuel injector possibly of the air blast type and supplied with the fuel and the blast air by a tubular stem 27a passing partly through the wall of the inlet head 19. The liquid fuel supply pipe 27 is connected to the outer end of this stem 27a.

Valves 28 in the fuel supply pipe 27 to each injector are connected to the common fuel supply pipe 29 and can be operated simultaneously for varying the total fuel supply or independently so that the fuel supply to each head can be stopped independently of the others. The valves 28 are not shown in detail as clearly they can be of any conventional type.

The three combustion air supply pipes 25 going to the three inlet heads 19 have right-angled bends. The air connections to these pipes are branched from the flanged cooling air inlet pipe 33 which is bolted on to the flanged inlet on the end cover 2 (for clearness part of this pipe 33 is shown broken away). For the purpose of this branching of the air, a Y piece 34 is provided and has its main portion flanged and attached by bolts 35 to the flanged end of the cooling air pipe 33. Each of the three branches 34a of the Y piece 34 is connected to one of the combustion air pipes 25 by a separate valve device. This device consists of a flanged valve casing 36 attached by bolts 37 at each end to flanges on a branch 34a of the Y piece 34 and on one of the pipes 25 and a valve inside the casing shown by way of example as a butterfly valve 38 on a spindle 39 operable from outside the valve casing by the valve lever 40 connected to the forked end of the piston rod 41 of a conventional type of operating device 42. Each of these devices can be controlled in the well-known manner by a separate control member 43, which is an electro switch when the devices 42 are electric and connected to electric supply leads 45 but will be a valve when devices 42 are fluid-pressure type devices. When the three valves 38 are operated together, they control the supply of combustion air to the three inlets to the combustion chamber altogether, but independently of the supply of cooling air through the pipe 33 to the outer casing. When the valves 38 are operated independently they can vary, or shut off, the air supply to one entry of the combustion chamber independently of the others. The operating devices 42 can, in well-known manner, move all the valves together progressively, or can be used to shut the valves completely and independently in sequence. There may be similar control mechanism for the fuel valves 28.

Figure 3:
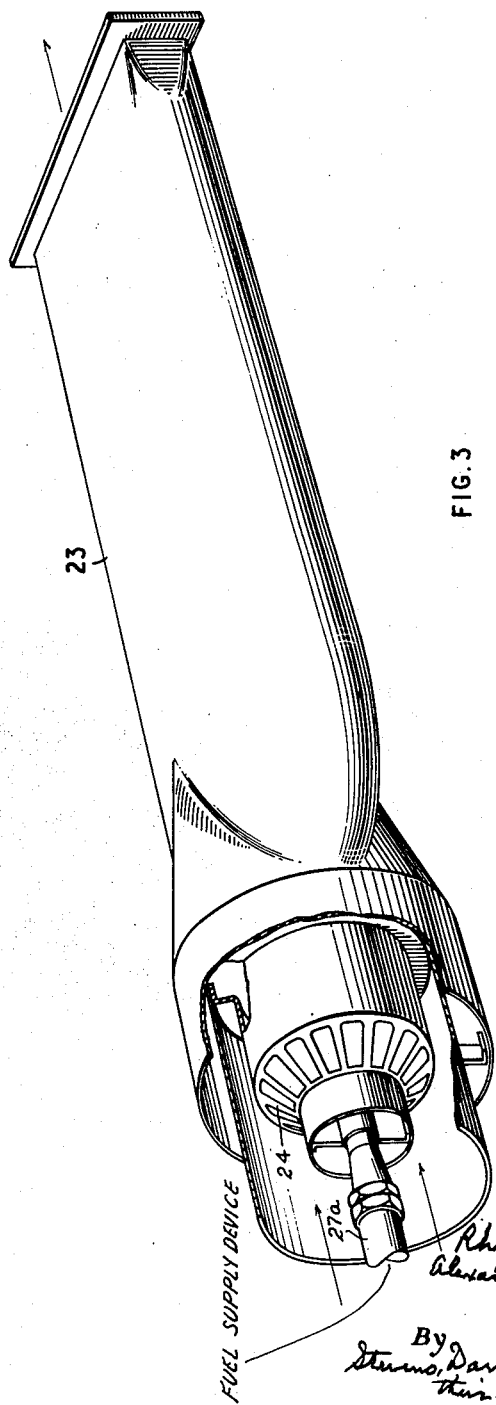
Figure 3 is an enlarged view of a modified flame tube.

In a modification the three separate tubes 22 are replaced by a single flame tube 23 which is cylindrical at its upper end but changes cross-section gradually, first to an oval shape conforming to the shape of the tubular port 1a, and, at its lower end, to a rectangular shape fitting the entry to the combustion chamber, this tube 23 being shown in isometric view in Fig. 3.

Figure 4:
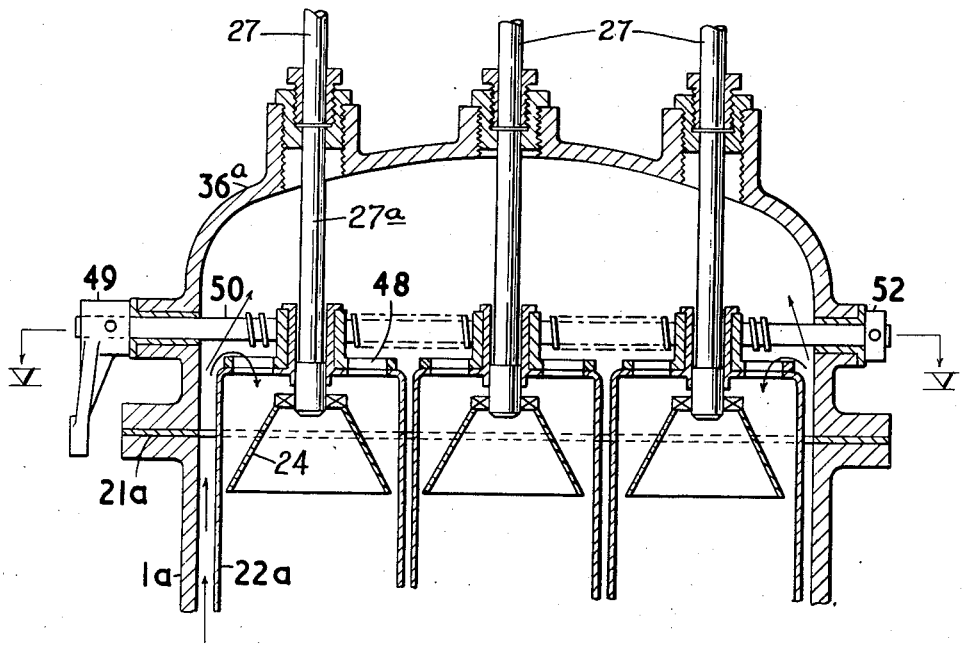
Figure 4 is an enlarged view in longitudinal section through a modified inlet head, viewed from the direction of the arrow IV in Figure 2.
Figure 5:
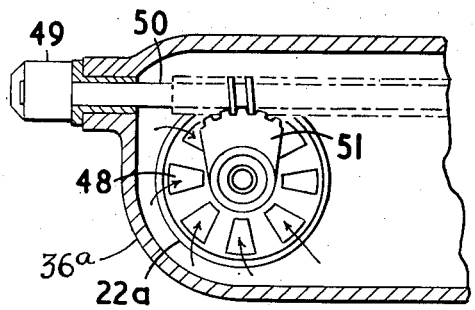
Figure 5 is part of a section on the line V—V of Figure 4.
Figure 6:
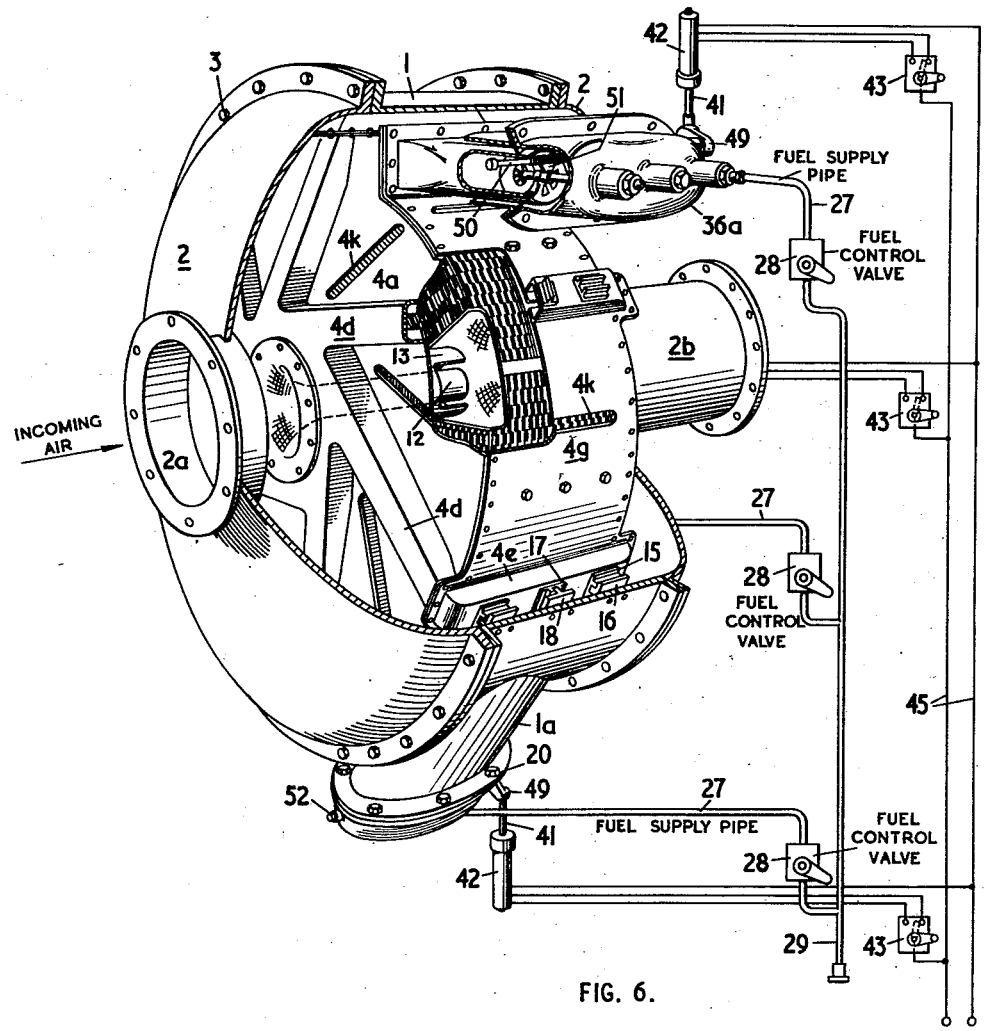
Fig. 6 is a view corresponding to Fig. 1 of the modification incorporating the inlet air shown in Figs. 4 and 5.

In another modification all the air for cooling and combustion can enter the outer pressure casing by way of the pipe 33 of Figure 1. The pipes 25, the Y piece 34 and the external air valves 38 in their casings 36 are omitted and instead the inlet heads are modified as shown in Figs. 4, 5 and 6. Attached to the flange of each tubular part 1a in place of each inlet head 19 of Figures 1 and 2 is the flanged head 36a which has its upper part closed, except for the apertures for the fuel injector stems 27a; the head 36a also serves as the valve casing in place of the casing 36 of Figure 1. The three tubes 22a are carried as shown in Fig. 4 by a member 21a which, unlike the previously described cover plate 21, allows air from the outer casing to enter the head 36a freely through the tubular part 1a. Mounted on the upper end of each tube 22a is the flat disc valve 48 rotatable about its central axis to bring sector shaped openings therein into and out of alignment with similar openings in the top cover of the tube 22. These valves 48 are rotatable by rotating the external handle 49. Journalled at each end in the head 36a is a worm spindle 50 of which the helical thread engages a toothed sector 51 formed on each valve 48. The operating lever 49 secured on one end of the worm spindle 50 and a collar 52 on the other end restrain the spindle against axial movement; rotation of spindle 50 by the lever 49 rotates the three disc valves 48 together. The valves and handle can be seen in Figure 4; in addition, the plan section view Figure 5 is a detail view shewing one valve 48, a part of the worm spindle 50 and the handle 49 separately from the rest of the parts. Thus air from the outer casing, flowing to the neighborhood of the valves 48 as shown by arrows in Fig. 4 will be admitted into the tubes 22a when the valves 48 are opened. The valves 48 in the three heads can be operated together or independently in the manner already described for the butterfly valves 38—i. e. each lever 49 is connected to the forked end of the piston rod 41 of the conventional operating device 42 controlled by the separate control member 43 connected to the supply leads 45. Simultaneously and independently operable valves 28 in the fuel supply pipes 27 to each injector are connected to the common fuel supply pipes 29.

In operation air, which may come from the compressor in a gas turbine plant, comes by way of the cooling air inlet pipe 33 into the outer pressure casing and washes over the exterior of the hollow-walled combustion chamber. Some of the air passes through the slits into the hollow walls for further cooling of the chamber, the whole of this air eventually joining the combustion products leaving the chamber.

With the air valves 38 or 48 and the fuel valves 28 all open, air branched from the stream of cooling air enters the three entries to the combustion chamber and thence passes by way of the burners—to which fuel is supplied and where combustion begins—into the combustion chamber tangentially at the three entries. When it is desired to reduce the output from the combustion chamber, the fuel supply is reduced by closure of valves 28. At the same time and in order to maintain correct fuel/air ratio the valves 38 or 48 are closed with the result that less air for combustion is branched from the stream of cooling air. In general, most of the air will, under all conditions, go solely as cooling air. If desired at low output, one of the valves 38 or 48 can be completely closed and the corresponding fuel valve 28 connected to the same head also closed; the air which would have gone through this valve will not however be shared by the other two combustion air entries and disturb the fuel air ratio, but most of it will be added to the stream of air which serves solely for cooling. Thus the arrangement according to the invention allows of a wide range of operation while correct fuel/air ratio can be maintained at each burner.

What we claim is:

1. A cyclone or vortex type combustion apparatus comprising in combination a volute chamber constituting the combustion chamber, means defining a plurality of tangentially directed peripheral combustion air inlets to and a central axially directed gas outlet from said combustion chamber, and an outer casing enclosing said combustion chamber with space therearound for flow of cooling air, a separate fuel injector located in each of said peripheral inlets, means for supplying cooling air in a main stream to the interior of said outer casing, means for supplying air in a plurality of streams branched from said main stream to each of said peripheral inlets, and a plurality of separate control valves each being located in one of said branch streams, the combustion chamber and outer casing being proportioned to define a cooling air path passing a major part of the total air.

2. A combustion apparatus according to claim 1 wherein said air control valves are operable independently of one another, and including a fuel supply pipe to each said fuel injector and a plurality of independently operable fuel control valves each of which is connected in one of said fuel supply pipes.

3. A cyclone or vortex type combustion apparatus comprising in combination a volute chamber constituting the combustion chamber, means defining a tangentially directed peripheral combustion air inlet to and a central axially directed gas outlet from said combustion chamber, an outer casing enclosing said combustion chamber with space therearound for the flow of cooling air, means for supplying to said outer casing air in a main stream as cooling air and means for supplying combustion air branched from said main stream to said combustion air inlet, means for injecting fuel into said combustion chamber, a central axially directed outlet from said outer casing positioned to receive the gas discharged from said axial outlet from the combustion chamber and the cooling air in one stream, an axial conduit defining a path for cooling air from said outer casing through the center of said combustion chamber into said axial outlets, and a control valve located in said branched stream, said volute combustion chamber, outer casing, and conduit being proportioned to define a cooling air path passing a major part of the total air.

4. In combination, a cyclone or vortex type combustion chamber comprising a volute chamber and means defining a plurality of tangentially directed combustion air inlets thereto disposed around the periphery and a central axially directed gas outlet from said combustion chamber, an outer casing enclosing said combustion chamber with space therearound for flow of cooling air, means for supplying cooling air in a main stream to the interior of said outer casing, means defining a plurality of branches from said main stream for combustion air to each of said peripheral inlets, a separate fuel injector located in each of said inlets, a separate and independently operable air control valve located in each of said branch streams, a fuel supply pipe to each said fuel injector, a plurality of independently operable fuel control valves each of which is connected in one of said fuel supply pipes, a cooling air conduit from said outer casing extending axially to the center of said volute combustion chamber, a central axially directed outlet from said outer casing for cooling air, and into which said gas outlet on the combustion chamber and said cooling air conduit also discharged, said volute combustion chamber, outer casing, and cooling air conduit being proportioned to define a cooling air path passing a major part of the total air.

5. A cyclone or volute type combustion apparatus comprising in combination a volute combustion chamber having two spaced co-axial side walls one of which is formed with a central axially directed outlet for combustion products, means defining a peripheral wall and a tangentially directed peripheral inlet for admitting combustion air between said side walls with a swirling motion about the axis thereof while the air flows radially inwards towards said outlet, means for introducing fuel into the region of swirling air between said side walls, an outer casing enclosing said chamber and spaced therefrom to permit the flow of cooling air around the chamber, means for supplying to said outer casing air in a main stream as cooling air and means to define a path to said peripheral inlet for a stream of combustion air branched from said main stream, a control valve located in said branched stream, and means for discharging from said outer casing cooling air with combustion products from the outlet of the volute combustion chamber, said combustion chamber and outer casing being proportioned to discharge into said discharging means air which is a substantial proportion of the total air supplied to said outer casing.

6. A cyclone or volute type combustion apparatus comprising in combination a volute combustion chamber having two spaced co-axial side walls one of which is formed with a central axially directed outlet for combustion products, means defining a peripheral wall and a plurality of tangentially directed peripheral inlets for admitting combustion air between said side walls with a swirling motion about the axis thereof while the air flows radially inwards towards said outlet, means for introducing fuel into the region of swirling air between said side walls, an outer casing enclosing said chamber and spaced therefrom to permit the flow of cooling air around the chamber, means for supplying to said outer casing air in a main stream as cooling air, valves at each of said inlets which when opened admit from the outer casing streams of combustion air branching from the cooling air stream, and means for discharging from said outer casing cooling air with combustion products from the outlet of the volute combustion chamber, said combustion chamber and outer casing being proportioned to discharge into said discharging means air which is a substantial proportion of the total air supplied to said outer casing.

7. A cyclone or vortex combustion apparatus comprising in combination a volute chamber constituting the combustion chamber, a plurality of tangentially directed combustion air inlets to a central axially directed gas outlet from said combustion chamber, an outer casing enclosing said combustion chamber with the space there around for flow of cooling air and including an axially directed air inlet duct for supplying cooling air as a main stream to the outer casing, an axially directed outlet duct from said outer casing for cooling air and combustion gas from said chamber outlet, a plurality of branch pipes outside said outer casing each branch pipe defining a flow path for combustion air branched from said main stream connecting the outer casing to one of said tangential inlets to the combustion chamber, and control valves in said branch pipes, said volute chamber and outer casing being proportioned to pass, as cooling air, a substantial part of the main stream.

References Cited in the file of this patent
UNITED STATES PATENTS

| | | |
|---|---|---|
| 617,753 | le Pontois | Jan. 17, 1899 |
| 2,458,066 | Farkas et al. | Jan. 4, 1949 |
| 2,458,497 | Bailey | Jan. 11, 1949 |
| 2,625,791 | Yellott | Jan. 20, 1953 |
| 2,627,719 | Stalker | Feb. 10, 1953 |